US007721859B2

(12) United States Patent
Kim et al.

(10) Patent No.: US 7,721,859 B2
(45) Date of Patent: May 25, 2010

(54) ROTARY FORCE CONTROLLING APPARATUS AND IMAGE FORMING APPARATUS INCLUDING THE SAME

(75) Inventors: Sung-dae Kim, Suwon-si (KR); Young-min Yoon, Yongin-si (KR); Cheol-young Han, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 429 days.

(21) Appl. No.: 11/271,770

(22) Filed: Nov. 14, 2005

(65) Prior Publication Data

US 2006/0225983 A1 Oct. 12, 2006

(30) Foreign Application Priority Data

Apr. 6, 2005 (KR) ...................... 10-2005-0028513

(51) Int. Cl.
*F16D 13/02* (2006.01)

(52) U.S. Cl. .................. 192/26; 192/12 BA; 192/17 C; 192/84.81

(58) Field of Classification Search ............. 192/12 BA, 192/26, 33 C, 41 S, 81 C, 84.81, 126
See application file for complete search history.

(56) References Cited

U.S. PATENT DOCUMENTS

| | | | | |
|---|---|---|---|---|
| 3,802,540 | A * | 4/1974 | Preston et al. | 192/26 |
| 4,193,483 | A * | 3/1980 | Ariga et al. | 192/26 |
| 5,101,944 | A * | 4/1992 | Kawai | 192/33 C |
| 2004/0124056 | A1* | 7/2004 | Yoon et al. | 192/26 |

FOREIGN PATENT DOCUMENTS

| | | |
|---|---|---|
| JP | 60-082544 | 5/1985 |
| JP | 60-202037 | 10/1985 |
| JP | 01-254531 | 10/1989 |
| JP | 02-188320 | 7/1990 |
| JP | 07-205504 | 8/1995 |
| JP | 09-118058 | 5/1997 |
| JP | 10-148985 | 6/1998 |
| KR | 1019900001046 | 2/1990 |
| KR | 1020030029772 | 4/2003 |
| KR | 1020040054428 | 6/2004 |

* cited by examiner

*Primary Examiner*—Roger L Pang
*Assistant Examiner*—Derek D Knight
(74) *Attorney, Agent, or Firm*—Roylance, Abrams, Berdo & Goodman, L.L.P.

(57) ABSTRACT

A rotary force controlling apparatus and an image forming apparatus including the same are provided. The rotary force controlling apparatus includes a clutch device having a shaft, and a rotary body mounted at one end of the shaft. A housing receives and rotates together with the shaft. A power transferring member is rotatably mounted in the housing and selectively rotates the housing by a clutch inserted between the housing and the power transferring member. A positioning unit protrudes from the periphery of the housing and positions a stop location of the rotary body. A solenoid unit is spaced apart from the clutch device and is selectively turned on and off. The positioning unit includes a first positioning unit that positions an initial location of the rotary body when the solenoid unit is turned on; and a plurality of second positioning units that are separated from the first positioning unit and stop the rotary body at a predetermined location when the solenoid unit is turned off. Since the solenoid unit is turned off when the rotary body is stopped, the solenoid unit is prevented from being overheated.

14 Claims, 12 Drawing Sheets

ROTARY FORCE CONTROLLING APPARATUS AND IMAGE FORMING APPARATUS INCLUDING THE SAME

CROSS-REFERENCE TO RELATED PATENT APPLICATION

This application claims the benefit under 35 U.S.C. §119 (a) of Korean Patent Application No. 10-2005-0028513, filed on Apr. 6, 2005, in the Korean Intellectual Property Office, the entire disclosure of which is hereby incorporated by reference.

BACKGROUND OF THE INVENTION

1. Field of the Invention

The present invention relates to an image forming apparatus. More particularly, the present invention relates to a rotary force controlling apparatus of an image forming apparatus that controls a rotary force transferred to a rotary body mounted on a shaft.

2. Description of the Related Art

Generally, an image forming apparatus, such as a laser printer, an LED printer, a digital copier, or a facsimile machine, transfers an image signal according to a digital signal input from a computer or a scanner onto a recording medium in a visible image form. This image forming apparatus includes an image forming unit for forming an image on a sheet, and a feed device for feeding the sheet to the image forming unit. The feed device and other devices used in the image forming apparatus use a rotary force controlling apparatus for controlling a rotary force transferred to a rotary body that is mounted on a rotary shaft. A conventional rotary force controlling apparatus used in a feed device of an image forming apparatus is described as an example.

FIG. 1 is a perspective view of a feed device of an image forming apparatus using a conventional rotary force controlling apparatus. FIG. 2 is an elevational view of the conventional rotary force controlling apparatus of FIG. 1. FIG. 3 illustrates the operation of the conventional rotary force controlling apparatus.

Referring to FIG. 1, a conventional feed device 1 includes a driving shaft 3 that is rotated by a driving source (not shown), such as a motor. A roller device 20 includes a driving roller 2 connected to and rotated by the driving shaft 3 and a driven roller 5 tightly attached to and rotated by the driving roller 2. The driven roller 5 is pivoted on levers 10*b* around a hinge shaft 7 to press against the driving roller 2 under the force of a pressing spring 8. The levers 10*b* are coupled to and rotate on the hinge shaft 7. One of the levers 10*b* has a mechanical interrupter 10*a* that follows a rotary cam 12. The feed device 1 includes the rotary cam 12 to actuate the interrupter 10*a* and to retract the driven roller 5 from the driving roller 2. When necessary, the rotary cam 12 acts as a clutch 14 for rotating the rotary cam 12.

When the driving roller 2 of the feed device 1 rotates, the driven roller 5 rotates and a sheet passes between the driving roller 2 and the driven roller 5 to an image forming unit (not shown) to form an image on the sheet. The roller device 20 has a pressure for conveying the sheet. Accordingly, when the rear end of the sheet leaves the roller device 20, a sudden impact is applied to the sheet that may distort the image. To prevent such distortion, when the rear end of the sheet leaves the roller device 20, the rotary cam 12 rotates to press the interrupter 10*a* and to separate the driven roller 5 from the driving roller 2.

The conventional feed device 1 includes a rotary force controlling apparatus 30 having the rotary cam 12 and the clutch 14 to separate the driving roller 2 and the driven roller 5.

Referring to FIGS. 2 and 3, the conventional rotary force controlling apparatus 30 includes a rotary shaft 10, a clutch unit 20 mounted on the rotary shaft 10, and a power transferring member 22 that receives a driving force from a driving source (not shown) to rotate the rotary shaft 10.

A rotary body 12, such as a cam, is mounted on one end of the rotary shaft 10. The clutch unit 20 is mounted around the periphery of the rotary shaft 10 and controls the rotary force transferred from the driving source (not shown) to control the rotation of the rotary shaft 10. The clutch unit 20 includes a clutch 32 mounted around the periphery of the rotary shaft 10 and a rotation controlling unit 50 for controlling the rotation of the rotary shaft 10.

The clutch 32 includes a first positioning unit 33 and a second positioning unit 34 for stopping the rotary body 12 at a predetermined location. The first and second positioning units 33 and 34 protrude from the circumference of the rotary body 12 and are spaced apart from each other.

The rotation controlling unit 50 interferes with the first and second positioning units 33 and 34 to control the rotation of the rotary shaft 10, and includes a bracket 60, an interfering unit 65, and an elastic member 90.

A solenoid unit 70, which is turned on and off by an electrical signal, is mounted on the bracket 60. When the solenoid unit 70 is turned on by the electrical signal, a magnetic force is generated and the interfering unit 65 is attracted to a predetermined location.

One side of interfering unit 65 is mounted on the bracket 60, and the interfering unit 65 interferes with or is released from the first and second positioning units 33 and 34 when the solenoid unit 70 is turned on or off. That is, the interfering unit 65 interferes with the first and second positioning units 33 and 34 mounted on the clutch 32 to control the rotation of the clutch 32. An armature 80 having an engaging unit 82 for interfering with the first and second positioning units 33 and 34 is mounted on one end of the interfering unit 65.

One end of the elastic member 90 is mounted on the bracket 65, and the other end is mounted on the interfering unit 65. The elastic member 90 provides an elastic force to the interfering unit 65 such that the armature 80 is coupled to and released from the first and second positioning units 33 and 34.

By the action of the solenoid unit 70, the armature 80 moves and interferes with the first and second positioning units 33 and 34 to stop the rotation of the rotary body 12 that is mounted on the rotary shaft 10. When the solenoid unit 70 is turned on, the interfering unit 65 moves so that the armature 80 interferes with the first positioning unit 33. When the solenoid unit 70 is turned off, the interfering unit 65 is returned to its original location by the elastic force of the elastic member 90, and is released from the first positioning unit 33 and interferes with the second positioning unit 34. That is, the action of the solenoid unit 70 and the elastic force of the elastic member 90 moves the interfering unit 65 back and forth between the first and second positioning units 33 and 34.

The power transferring member 22 is mounted around the clutch unit 20, and receives the rotary force from the driving source (not shown) to rotate the rotary shaft 10. The power transferring member 22 is preferably a gear. The rotary force transferred by the power transferring member 22 is selectively transferred to the rotary shaft 10 by the clutch unit 20.

The conventional rotary force controlling apparatus 30 includes two positioning units 33 and 34. The locations of the two positioning units 33 and 34 are spaced apart from each other so that the two positioning units 33 and 34 are controlled when the solenoid unit 70 is turned on and off to control the location of the rotary body 12. Accordingly, when the rotary body 12 is continuously held at any one location, the solenoid unit 70 must stay in the ON state or the OFF state.

When the solenoid unit 70 is continuously OFF, there is no problem. However, when the solenoid unit 70 is continuously ON, it continuously draws power and can become overheated. This can weaken its magnetic force and attracting force. Accordingly, the force for attracting the armature 80 is weakened, and thus the armature 80 may not accurately interfere with the two positioning units 33 and 34.

Also, heat generated in the solenoid unit 70 can shorten its life span or damage other components.

Furthermore, when the solenoid unit 70 is in the ON state for a long time, the armature 80 can be magnetized. Thus, when the solenoid unit 70 is turned off, the armature 80 does not immediately separate from the solenoid unit 70. That is, a time delay occurs and the operation of the rotary body 12 cannot accurately be controlled.

Also, since only two positioning units are used, the rotary body 12 cannot stop at three or more locations. Moreover, when the solenoid unit 70 is turned off and then on, the engaging unit 82 of the armature 80 is engaged with the first positioning unit 33 by the time delay. Thus, the rotary body 12 cannot rotate.

Accordingly, a need exists for an improved rotary force controlling apparatus for an image forming apparatus that controls a rotary force transferred to a rotary body mounted on a shaft.

SUMMARY OF THE INVENTION

The present invention provides a rotary force controlling apparatus and an image forming apparatus including the same that stops a rotary body at a predetermined location when a solenoid unit is turned OFF.

The present invention also provides a rotary force controlling apparatus and an image forming apparatus including the same that is adapted to stop a rotary body at a plurality of locations.

The present invention also provides a rotary force controlling apparatus and an image forming apparatus including the same that easily changes the location of a rotary body.

According to an aspect of the present invention, a rotary force controlling apparatus of an image forming apparatus includes a clutch device having a shaft and a rotary body mounted at one end of the shaft. A housing receives and rotates together with the shaft. A power transferring member is rotatably mounted in the housing and selectively rotates the housing by a clutch inserted between the housing and the power transferring member. A positioning unit protrudes from the periphery of the housing and positions a stop location of the rotary body. A solenoid unit is spaced apart from the clutch device and is selectively turned on and off. The positioning unit includes a first positioning unit that positions an initial location of the rotary body when the solenoid unit is turned on. A plurality of second positioning units are separated from the first positioning unit and stop the rotary body at a predetermined location when the solenoid unit is turned off.

The solenoid unit may include a bracket having a solenoid mounted thereon. The solenoid operates by an electrical signal. An armature mounted on the bracket has an interfering unit that interferes with the first positioning unit when the solenoid is turned on and interferes with the second positioning units when the solenoid is turned off. An elastic member connected between the bracket and the armature provides a biasing force to the armature such that the interfering unit interferes with or is released from the first and second positioning units.

The interfering unit may include a first interfering unit that interferes with the first positioning unit when the solenoid is turned on. A second interfering unit is spaced apart from the first interfering unit and interferes with the second positioning units when the solenoid is turned off.

The clutch may be a spring clutch.

The second positioning units may be located on substantially the same circumference around the surface of the housing.

The second positioning units may have substantially the same height, which is different from that of the first positioning unit, such that the first positioning unit interferes with the interfering unit only when the when the solenoid is turned on.

The first positioning unit may include a first portion protruding from the surface of the housing and a second portion extending from the first portion in the axial direction of the housing that interferes with the interfering unit when the solenoid is turned on.

The second positioning units may form a pair and are symmetrical around the center of the housing. The first positioning unit is positioned at 90° from each of the second positioning units around the center of the housing.

Interference between the interfering unit and any one of the second positioning units may be released by the instantaneous ON and OFF operation of the solenoid unit.

According to another aspect of the present invention, a rotary force controlling apparatus of an image forming apparatus includes a clutch device having a shaft and a rotary body mounted at one end of the shaft. A housing receives and rotates together with the shaft. A power transferring member is rotatably mounted in the housing and selectively rotates the housing by a clutch inserted between the housing and the power transferring member. A positioning unit protrudes from the periphery of the housing and has a first positioning unit that positions an initial location of the rotary body and a plurality of second positioning units that stop the rotary body at a predetermined location. A solenoid unit includes a bracket on which a solenoid is mounted. An armature is mounted on the bracket and has an interfering unit that interferes with the first positioning unit when the solenoid is turned on and interferes with the second positioning unit when the solenoid is turned off. An elastic member connected between the bracket and the armature provides a biasing force to the armature such that the interfering unit interferes with or is released from the first and second positioning units. A stopper is mounted on the bracket and controls the motion of the armature such that the interfering unit interferes with the second positioning units when the solenoid is turned off. The solenoid is operated by an electrical signal.

The clutch device and the solenoid unit may be spaced apart from each other.

The apparatus may further include a connecting member for integrally assembling the clutch device and the solenoid unit together.

The interfering unit may include a first interfering unit that interferes with the first positioning unit when the solenoid is turned on. A second interfering unit is spaced from the first interfering unit and interferes with the second positioning units when the solenoid is turned off.

The second positioning units may be located on substantially the same circumference around the surface of the housing.

The second positioning units may have substantially the same height, which is different from that of the first positioning unit, such that the first positioning unit interferes with the interfering unit only when the solenoid is turned on.

The first positioning unit may include a first portion protruding from the surface of the housing and a second portion extending from the first portion in the axial direction of the housing and interferes with the interfering unit when the solenoid is turned on.

The second positioning units may form a pair and are symmetrical around the center of the housing. The first positioning unit is positioned at 90° from each of the second positioning units around the center of the housing.

Interference between the interfering unit and any one of the second positioning units may be released by the instantaneous ON and OFF operation of the solenoid unit.

According to another aspect of the present invention, an image forming apparatus includes the above-mentioned rotary force controlling apparatus, Other objects, advantages and salient features of the invention will become apparent from the following detailed description, which, taken in conjunction with the annexed drawings, discloses exemplary embodiments of the present invention.

BRIEF DESCRIPTION OF THE DRAWINGS

The above and other features and advantages of the present invention will become more apparent by describing in detail exemplary embodiments thereof with reference to the attached drawings in which:

FIG. 9 illustrates the relationship between a clutch device and a solenoid unit when the solenoid unit is turned on;

FIGS. 10A through 10C illustrate the operation when the clutch device rotates and stops when the solenoid unit is turned on;

Throughout the drawings, like reference numerals will be understood to refer to like parts, components and structures.

DETAILED DESCRIPTION OF EXEMPLARY EMBODIMENTS

Figure 1:
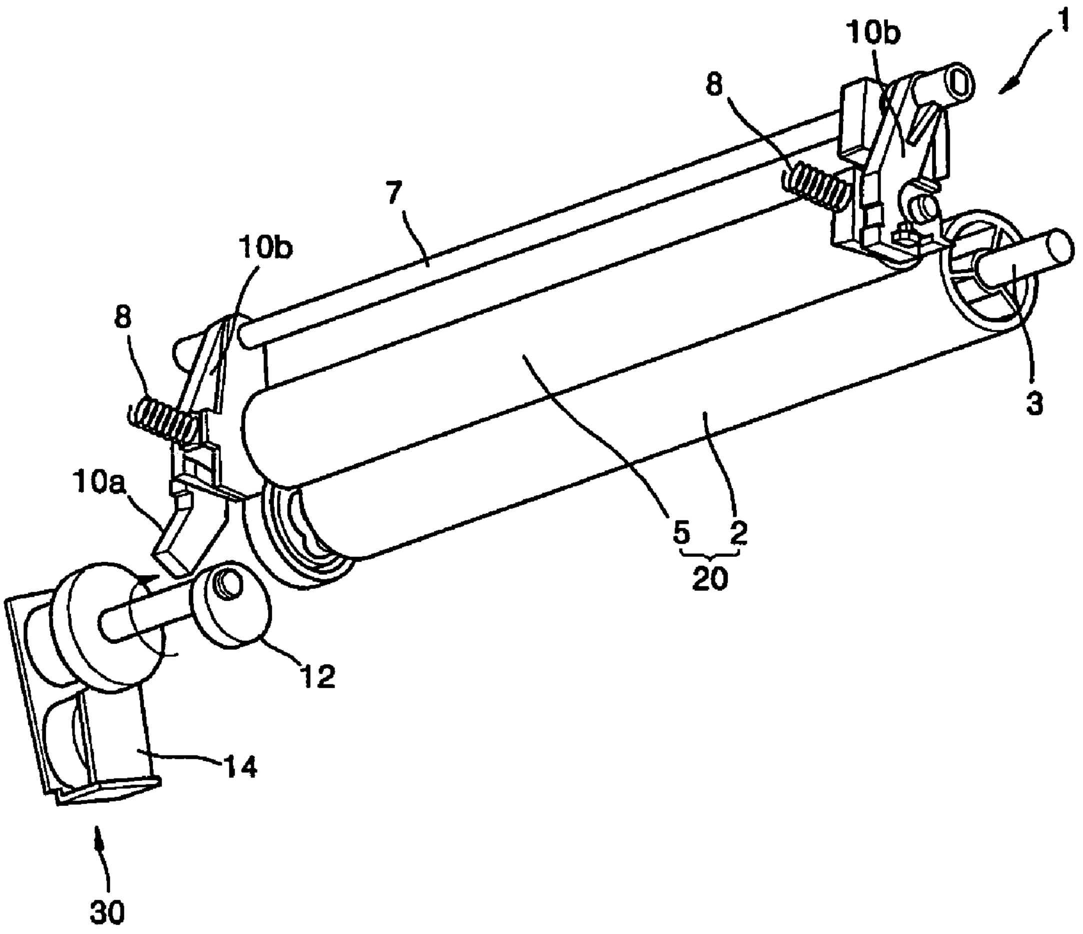
FIG. 1 (PRIOR ART)
FIG. 1 is a perspective view of a feed device of an image forming apparatus having a conventional rotary force controlling apparatus.
Figure 2:
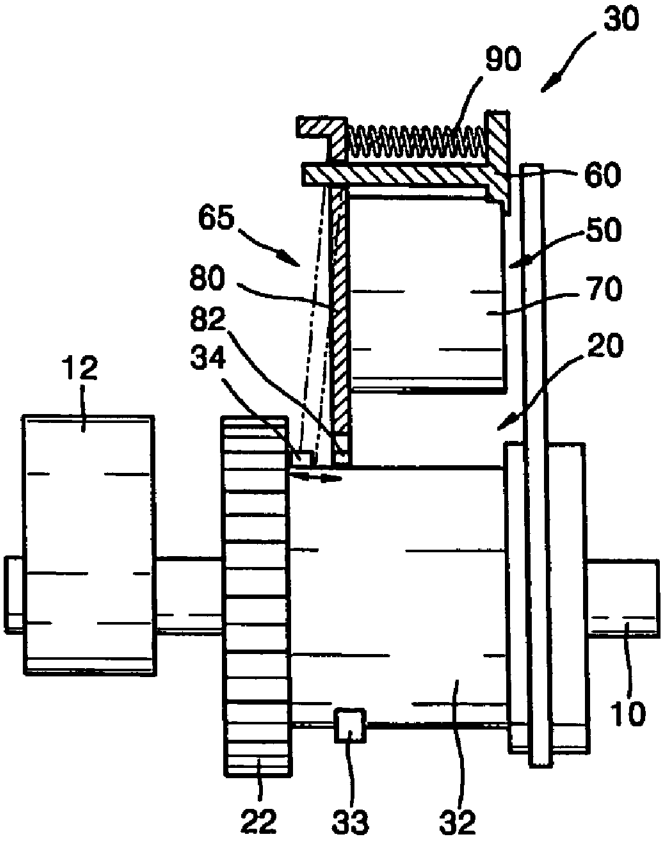
FIG. 2 (PRIOR ART)
FIG. 2 is an elevational view of the conventional rotary force controlling apparatus of FIG. 1.
Figure 3:
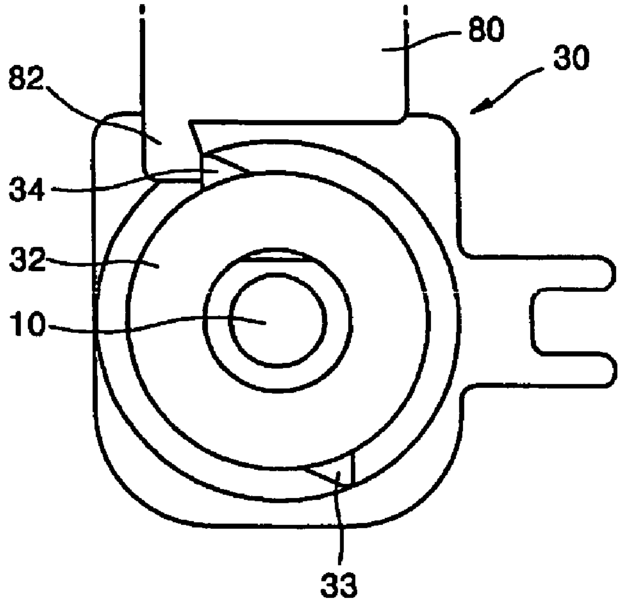
FIG. 3 (PRIOR ART)
FIG. 3 illustrates the operation of the conventional rotary force controlling apparatus.

The present invention is described more fully with reference to the accompanying drawings in which exemplary embodiments of the present invention are shown. The invention may, however, be embodied in many different forms, and should not be construed as being limited to the exemplary embodiments set forth herein; rather, these exemplary embodiments are provided so that this disclosure is thorough and complete, and will fully convey the concept of the invention to those skilled in the art. In the drawings, the thicknesses of lines and the size of components are exaggerated for clarity.

First, an image forming apparatus is described first. An electrophotographic type printer is used as an example, but the present invention is not limited to this exemplary embodiment. For example, the present invention may be used in an image forming apparatus, such as a facsimile machine or a copier.

Figure 4:
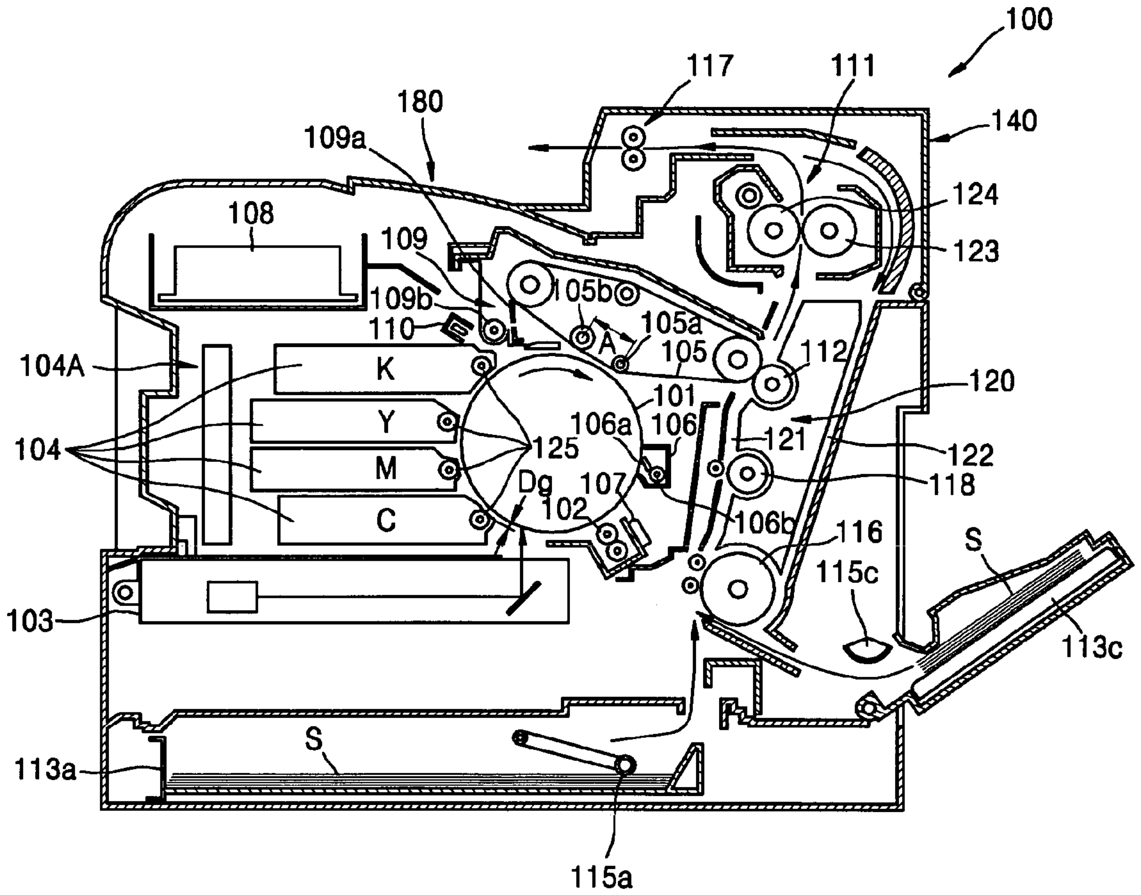
FIG. 4 is a schematic elevational view in partial cross section of an image forming apparatus according to an exemplary embodiment of the present invention.

FIG. 4 is a schematic elevational view in cross section of an image forming apparatus according to an exemplary embodiment of the present invention.

The image forming apparatus 100 includes a photosensitive body 101, a charging roller 102, a light scanning unit 103, four developer units 104, and a transfer belt 105.

The photosensitive body 101 is coated by deposition with a photoconductive material layer around a cylindrical metal drum, and a portion of the surface thereof is exposed. The photosensitive body 101 rotates while an electrostatic latent image corresponding to an image to be printed is formed on the surface of the photosensitive body 101 by the light irradiated by the light scanning unit 103.

The charging roller 102 is an example of a charging unit for charging the photosensitive body 101 to a uniform potential. The charging roller 102 supplies charge to the photosensitive body 101 while rotating in or out of contact with the photosensitive body 101, thereby charging the surface of the photosensitive body 101 to a uniform potential. A charging bias voltage or a corona charging unit (not shown) provide the charge.

The light scanning unit 103 is provided below the photosensitive body 101, and irradiates the light for forming the electrostatic latent image onto the surface of the photosensitive body 101 according to a computer signal. The light scanning unit 103 includes a light source (not shown) for irradiating a laser beam, and a beam deflector for deflecting the laser beam. The light scanning unit 103 generally uses a laser scanning unit (LSU) having a laser diode light source.

Four cartridge type developers 104C, 104M, 104Y, and 104K are detachably mounted in the frame 140, and four powdered color toners, cyan (C), magenta (M), yellow (Y) and black (K) toners, are respectively stored in the developers 104C, 104M, 104Y, and 104K. The developers 104C, 104M, and 104Y, and 104K include development rollers 125 for supplying the color toners to the electrostatic latent image formed on the photosensitive body 101 to form toner images.

The developers 104C, 104M, 104Y, and 104K maybe refilled when their color toner is exhausted.

The development rollers 125 apply the color toners to the electrostatic latent image formed on the photosensitive body 101 to develop a toner image. A development bias voltage is applied to the development rollers 125 to supply the color toners to the photosensitive body 101.

The development rollers 125 may contact the photosensitive body 101 or be spaced from its surface by a development gap (Dg). A force directed from the photosensitive body 101 to the development roller 125 is generated by an electric field, and the charged toner is conveyed in a development region formed by the development gap (Dg).

A developer driving apparatus 104A selectively drives the developers 104C, 104M, 104Y, and 104K and is disposed on one side of the developers 104C, 104M, 104Y, and 104K. The rotary force controlling apparatus of the exemplary embodiments of the present invention may be used to selectively drive the corresponding developers 104C, 104M, 104Y, and 104K. For example, the developer may be driven so that the rotary body coupled to the shaft of the rotary force controlling apparatus selectively interferes with each of the developers.

In the present exemplary embodiment, the developers 104C, 104M, 104Y, and 104K are arranged in the color order of cyan, magenta, yellow, and black. A pre-transfer erasing unit 110 is provided on the developer 104K. A light scanning unit 103 and an erasing lamp 107 are provided below the photosensitive body 101. A sheet conveying unit 120 is provided opposite the developers 104C, 104M, 104Y, and 104K with respect to the photosensitive body 101.

The toner images cyan (C), magenta (M), yellow (Y), and black (K) that are sequentially formed on the photosensitive body 101 are sequentially transferred and superimposed onto the transfer belt 105 to form a color toner image. Generally, the length of the transfer belt 105 is equal to or greater than that of a sheet (S) on which the color toner image is finally formed.

A plurality of supporting rollers are provided at the inner surface of the transfer belt 105 to support and move the transfer belt 105. A nip roller 105*a* is provided at the inner surface of the transfer belt 105, such that the photosensitive body 101 and the transfer belt 105 form a nip of length (A). A middle transfer roller 105*b* receives a first transfer bias voltage so that the color toner images formed on the photosensitive body 101 are transferred onto the transfer belt 105.

The transfer belt 105 faces the photosensitive body 101 in the section between the middle transfer roller 105*b* and the nip roller 105*a*, such that the color toner images developed on the photosensitive body 101 are transferred onto the transfer belt 105. That is, the transfer belt 105 is supported by the plurality of supporting rollers and rotates while the color toner images developed on the photosensitive body 101 are transferred onto the transfer belt 105.

A first cleaning unit 106 includes a first blade 106*a*, which contacts the surface of the photosensitive body 101 and scrapes remaining waste toner off the surface of the photosensitive body 101 after the transfer process is complete, and a first conveying means 106*b* for conveying the waste toner to a waste toner storing unit (not shown). The first conveying means 106 is preferably an auger.

A second cleaning unit 109 removes remaining waste toner from the transfer belt 105 after the color toner images are transferred onto the sheet (S). The second cleaning unit 109 includes a second blade 109*a* for scraping the waste toner from the surface of the transfer belt 105, and a second conveying means 109*b* for conveying the waste toner to the waste toner storing unit (not shown). The second conveying means 109*b* is preferably an auger.

A transfer roller 112 faces the surface of the transfer belt 105 having the color toner images, and receives a transfer bias voltage of opposite polarity to the color toner images so that the color toner images are transferred from the transfer belt 105 onto the sheet (S). The color toner images are transferred onto the sheet (S) by an electrostatic force generated between the transfer belt 105 and the transfer roller 112. The transfer roller 112 is spaced from the transfer belt 105 when the color toner images are transferred onto the transfer belt 105. After the color toner images are completely transferred onto the transfer belt 105, the transfer roller 112 contacts the transfer belt 105 to transfer the color toner images onto the sheet (S). Also, the color toner images transferred onto the outer side of the transfer belt 105 may be transferred onto the sheet (S) passing between the transfer roller 112 and the transfer belt 105 by the contact pressure between the transfer belt 105 and the transfer roller 112. The rotary force controlling apparatus of the present invention may be used for controlling the operation of the transfer roller 112. The rotary force controlling apparatus is described later in detail.

A pre-transfer erasing unit 110 removes charge from areas (non-image regions) of the photosensitive body 101 on which no toner images are formed before transferring the color toner images from the photosensitive body 101 onto the transfer belt 105. The pre-transfer erasing unit 110 improves the transfer efficiency from the photosensitive body 101 to the transfer belt 105.

An erasing lamp 107 is an example of an eraser for removing the remaining charge from the surface of the photosensitive body 101 before performing the charging operation. The erasing lamp 107 irradiates light onto the surface of the photosensitive body 101 to remove the charge remaining on its surface.

A high voltage power supply unit 108 provides a voltage to components of the image forming apparatus 100, such as a development bias voltage for developing the color toner from the developers 104C, 104M, 104Y, and 104K onto the photosensitive body 101, a development preventing bias voltage for preventing the color toner from being attached to the photosensitive body 101, a first transfer bias voltage for transferring the color toner images from the photosensitive body 101 onto the transfer belt 105, a second transfer bias voltage for transferring the toner image from the transfer belt 105 onto the sheet (S), and a charging voltage provided to the charging roller 102.

The fixing unit 111 includes a heat roller 123 and a pressing roller 124 that faces the heat roller 123 and fixes the color toner image onto the sheet (S) by applying heat and pressure to the color toner images transferred onto the sheet (S). The heat roller 123 is a heat source for permanently fixing the color toner images, and faces the pressing roller 124 in an axial direction. The pressing roller 124 faces the heat roller 123 and applies a high pressure to the sheet (S) to fix the color toner images onto the sheet (S).

A discharge roller 117 discharges the sheet (S) having the fixed toner image from the image forming apparatus 100 into a discharge tray 180.

Also, the image forming apparatus 100 includes a feeding cassette 113*a* in which sheets (S) are loaded. The feeding cassette 113*a* is an example of a loading means for loading the sheets (S). The loading means may include a multi-purpose feeder (MPF) 113*c*. The MPF 113*c* is mainly used for conveying an overhead presentation (OHP) sheet or a non-standard sheet (S).

The pickup rollers 115*a* and 115*c* are placed above the sheet feeding cassettes 113*a* and 113*c*, and convey the sheet (S) from the sheet feeding cassettes 113*a* and 113*c* to a feed roller 116.

The feed roller 116 conveys the sheet (S) from the sheet feeding cassettes 113*a* and 113*c* to the sheet conveying unit 120 by pickup rollers 115*a* and 115*c*.

The sheet conveying unit 120 includes a sheet feeding path 121 for guiding the sheet (S) between the feed roller 116 and the fixing unit 111, and a duplex path 122 for duplex printing. The sheet conveying unit 120 is provided with a registration roller 118. The registration roller 118 registers the sheet (S) such that the color toner images may be transferred onto the desired portion of the sheet (S) before the sheet (S) passes from the feed roller 116 between the transfer belt 105 and the transfer roller 112. The sheet (S) passes between the transfer belt 105 and the transfer roller 112 such that the color toner images are transferred onto the sheet (S). The toner image is fixed to the sheet (S) by the fixing unit 111, and the sheet (S) is discharged from the image forming apparatus 100 by the discharge roller 117.

When duplex printing, the discharge roller 117 rotates in reverse and conveys the sheet (S) along the duplex path 122. Thereby, the sheet (S) is reversed such that an image is printed on its back surface. The reversed sheet (S) is conveyed along the sheet feeding path 121 by the feed roller 116 to receive the image on its back surface.

Hereinafter, the operation of the image forming apparatus 100 according to an exemplary embodiment of the present invention is described in detail.

Color image information is composed by mixing corresponding information on cyan (C), magenta (M), yellow (M), and black (K) colors. In the present exemplary embodiment, the color toner images may be superimposed on the transfer belt 105 in order of cyan (C), magenta (M), yellow (M) and black (K), and may be transferred and fixed onto the sheet (S) to form the color image.

The surface of the photosensitive body 101 is charged with a uniform potential by the charging roller 102. An optical signal corresponding to the image information on cyan is scanned onto the rotating photosensitive body 101 by the light scanning unit 103, thereby reducing the resistance of the portion onto which the light is scanned and removing the charge adhering to the surface of the photosensitive body 101. Accordingly, a potential difference is generated between the portion onto which the light is scanned and the portion onto which no light is scanned, and thus the electrostatic latent image is formed on the surface of the photosensitive body 101.

When the electrostatic latent image approaches the cyan developer 104C by the rotation of the photosensitive body 101, the development roller 125 of the cyan developer 104C begins to rotate and the development bias voltage is applied from the high voltage power supply unit 108 to the development roller 125 of the cyan developer 104C. Also, the development preventing bias voltage for preventing image development is applied to the development rollers 125 of the other developers 104M, 104Y, and 104K. Then, only the cyan toner traverses the development gap (Dg) to adhere to the electrostatic latent image that is formed on the surface of the photosensitive body 101, thereby forming the cyan (C) toner image.

When the cyan (C) toner image is brought to the transfer belt 105 by the rotation of the photosensitive body 101, the toner image is transferred onto the transfer belt 105 by the first transfer bias voltage or the contact pressure between the photosensitive body 101 and the transfer belt 105.

After the cyan toner image is completely transferred onto the transfer belt 105, the toner images of magenta (M), yellow (M), and black (K) colors are superimposed and transferred onto the transfer belt 105 in a similar way. At this time, the developer driving apparatus 200 (FIG. 5) drives the developers 104C, 104M, 104Y, and 104K to develop the image.

In the above-mentioned process, the transfer roller 112 is spaced from the transfer belt 105. Since four color toner images are transferred and superimposed onto the transfer belt 105 to form the color toner image on the transfer belt 105, the transfer roller 112 contacts the transfer belt 105 to transfer the color toner images to the sheet (S). At this time, the rotary force controlling apparatus according to exemplary embodiments of the present invention acts on one side of the transfer roller 112 such that the transfer roller 112 contacts the transfer belt 105 for a predetermined time.

The sheet (S) is supplied from the sheet feeding cassette 113*a* (or the MPF 113*c*) such that the leading edge of the sheet (S) approaches the point where the transfer belt 105 contacts the transfer roller 112 when the top end of the color toner image formed on the transfer belt 105 approaches the point where the transfer belt 105 contacts the transfer roller 112. When the sheet passes between the transfer belt 105 and the transfer roller 112, the color toner image is transferred onto the sheet (S) by the second transfer bias voltage and then fixed on the sheet (S) by the heat and pressure of the fixing unit 111. Then, the sheet (S) having the color image is discharged, thereby finishing the color image forming process.

For the next printing, the first and second cleaning units 106 and 109 remove the waste toner remaining on the photosensitive body 101 and the transfer belt 105, and the erasing lamp 107 irradiates light onto the photosensitive body 101 to remove any charge remaining on the photosensitive body 101.

The rotary force controlling apparatus according to an exemplary embodiment of the present invention is described with reference to the accompanying drawings. As mentioned above, the rotary force controlling apparatus may be used for controlling the operation of the transfer roller 112. The rotary force controlling apparatus according to the exemplary embodiment of the present invention controls the rotating position of the rotary body mounted on one side of the shaft.

Figure 5:
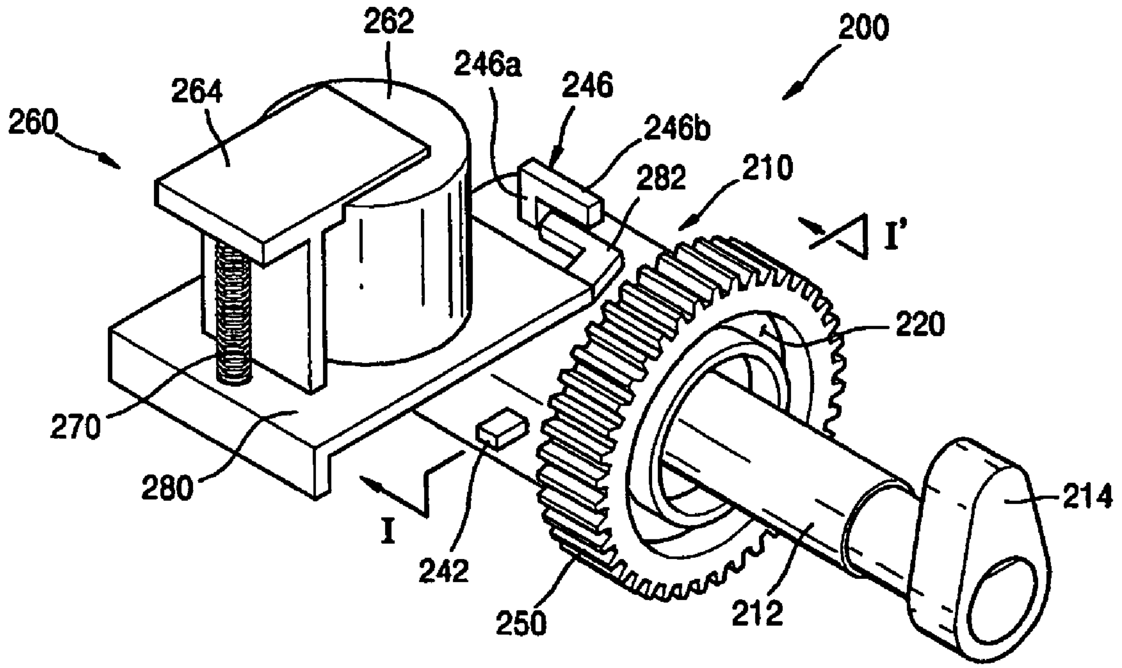
FIG. 5 is a perspective view of a rotary force controlling apparatus according to an exemplary embodiment of the present invention.
Figure 6:
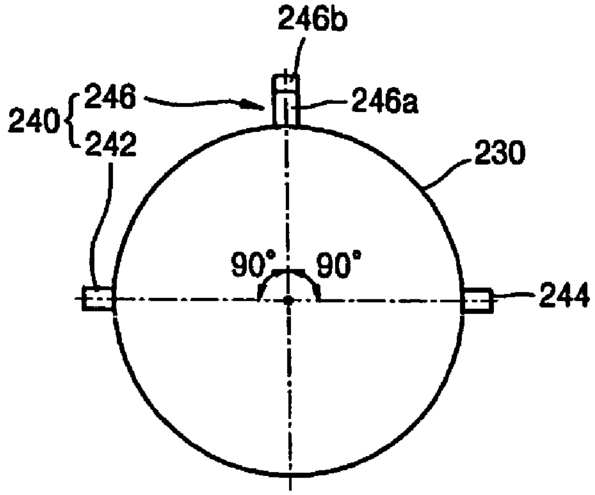
FIG. 6 is an elevational view in cross section taken along line I-I' of a clutch device of the rotary force controlling apparatus of FIG. 5.

FIG. 5 is a perspective view of a rotary force controlling apparatus according to an exemplary embodiment of the present invention. FIG. 6 is a cross-sectional view taken along line I-I' of a clutch device of the rotary force controlling apparatus shown in FIG. 5.

Referring to FIGS. 5 and 6, the rotary force controlling apparatus 200 according to an exemplary embodiment of the present invention includes a clutch device 210 and a solenoid unit 260. The clutch device 210 and the solenoid unit 260 are preferably spaced apart from each other. Although in the present exemplary embodiment the clutch device 210 and the solenoid unit 260 are spaced apart from each other, the present invention is not limited to this, and various modifications may be made. For example, the clutch device 210 and the solenoid unit 260 may be integrally assembled using a frame.

The clutch device 210 includes a shaft 212 having a rotary body 214 mounted at the one end thereof, a clutch 220 for controlling the rotation of the shaft 212, a housing 230 for wrapping the clutch 220, a positioning unit 240 for positioning the stop location of the rotary body 214 by the operation of the solenoid unit 260, and a power transferring member 250 for receiving a rotary force from a driving source (not shown).

The shaft 212 is inserted into an axis hole of the housing 230, and rotates together with the housing 230. The rotary body 214, such as a cam, is fixed to one side of the shaft 212. The rotary body 214 is used for interfering with or being released from the component mounted on the image forming apparatus at a certain location. For example, the rotary body 214 interferes with one side of the transfer roller 112 at a certain location by the control of the clutch 220, and thus the transfer roller 112 contacts the transfer belt 105. The housing 230 is rotatably mounted on a support frame (not shown).

The clutch 220 is disposed between the housing 230 and the power transferring member 250. The clutch 220 selectively transfers the rotary force transferred from the driving source to the housing 230. That is, the clutch 220 selectively controls the rotary force transferred from the driving source (not shown) to rotate the housing 230. Accordingly, when a load is applied to the housing 230, the power transferring member 250 slips. The clutch 220 is preferably a spring clutch. Since the structure and operation of the spring clutch are widely known in the art, their description is omitted here.

The power transferring member 250 is rotatably mounted in the housing 230 and selectively rotates the housing 230 through the clutch 220. Power from the driving source rotates the power transferring member 250. The power transferring member 250 is preferably a gear. Also, the driving source may be a driving motor. The rotary force transferred by the power transferring member 250 is selectively transferred to the rotary body 214 through the clutch 220.

Referring to FIG. 6, the positioning unit 240 protrudes from the periphery of the housing 230 and positions a stop location of the rotary body 214. The positioning unit 240 includes a first positioning unit 246 for positioning an initial location of the rotary body 214 and a plurality of second positioning units 242 and 244 for stopping the rotary body 214 at a certain location.

The first positioning unit 246 positions the initial location of the rotary body 214 when the solenoid unit 260 is turned on. The first positioning unit 246 includes a first portion **246*a* protruding from the peripheral surface of the housing 230, and a second portion 246*b* that extends from the first portion 246*a* in the axial direction of the housing 230. The second portion 246*b* interferes with (or engages) an interfering unit 282 (which is described later) when the solenoid unit 260 is turned on, but not when the solenoid unit 260 is turned off. That is, the second portion 246*b* preferably interferes with the interfering unit 282 only when the solenoid unit 260 is turned on. For example, the first positioning unit 246 may be formed in a reversed z,900** -shape (or substantially L-shaped).

The plurality of second positioning units 242 and 244 are spaced from the first positioning unit 246. The second positioning units 242 and 244 interfere with the interfering unit 282 and stop the rotary body 214 at certain locations when the solenoid unit 260 is turned off. Preferably, the plurality of second positioning units 242 and 244 are provided at locations such that the rotary body 214 stops at a desired, predetermined location.

In the present exemplary embodiment, for clarity, two second positioning units are used. Preferably, the second positioning units 242 and 244 are located on substantially the same circumference around the peripheral surface of the housing 230. Also, the second positioning units 242 and 244 have substantially the same height, which is different from that of the first positioning unit 246, such that the first positioning unit 246 interferes with the interfering unit 282 only the solenoid unit 260 is turned on. As shown in FIG. 6, the second positioning units 242 and 244 form a pair, and are positioned symmetrically around the center of the housing 230. Preferably, the first positioning unit 246 is positioned at 90° from each of the second positioning units 242 and 244.

Referring back to FIG. 5, the solenoid unit 260 is spaced from the clutch device 210. When the solenoid unit 260 is turned on, the positioning unit 240 interferes with the interfering unit 282 to control the stopping location of the rotary body 214. The solenoid unit 260 includes a bracket 264, an armature 280 that is reciprocal-movably mounted on the bracket 264, and an elastic member 270 for providing an elastic biasing force to the armature 280. Also, a solenoid 262 is mounted on the bracket 264 and is turned on and off by an electrical signal.

An interfering unit 282 for interfering with the positioning unit 240 is mounted on one side of the armature 280. The interfering unit 282 interferes with the first positioning unit 246 when the solenoid 262 is turned on, and interferes with the second positioning units 242 and 244 when the solenoid 262 is turned off. When the solenoid 262 is turned on by the electrical signal, a magnetic force is generated and thus the armature 280 is attracted. At this time, the interfering unit 282 mounted on the armature 280 moves to a location for interfering with the first positioning unit 246. When the solenoid 262 is turned off, the magnetic force disappears and thus the armature 280 is separated from the solenoid 262. At this time, the interfering unit 282 moves to a location for interfering with the second positioning units 242 and 244. That is, the interfering unit 282 moves between the location for interfering with the first positioning unit 246 and the location for interfering with the second positioning units 242 and 244, as the solenoid 262 is turned on and off.

Figure 14:
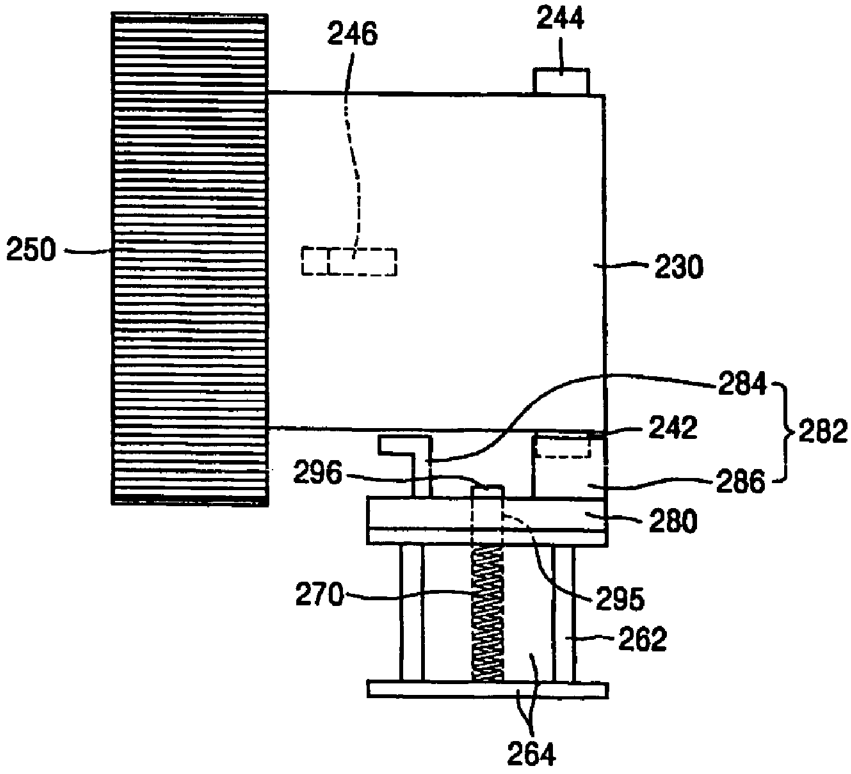
FIG. 14 is a front elevational view of a rotary force controlling apparatus according to another exemplary embodiment of the present invention.

As shown in FIG. 14, the interfering unit 282 may include a first interfering unit 284 for interfering with the first positioning unit 246 when the solenoid 262 is turned on, and a second interfering unit 286 for interfering with the second positioning units 242 and 244 when the solenoid 262 is turned off. These are described later in detail.

As mentioned above, the interfering unit 282 interferes with or is released from the first positioning unit 246 and the second positioning units 242 and 244 to control the rotation of the rotary body 214 when the solenoid 262 is turned on and off. That is, the interfering unit 282 interferes with the first positioning unit 246 and the second positioning units 242 and 244 to control the rotation of the rotary body 214.

One end of the elastic member 270 is attached to the bracket 264, and the other end is attached to the armature 280. The elastic member 270 provides an elastic biasing force to the armature 280 such that the interfering unit 282 interferes with or is released from the first positioning unit 246 and the second positioning units 242 and 244. That is, the interfering unit 282 is attracted to the solenoid 262 by the magnetic force when the solenoid 262 is turned on. At this time, the interfering unit 282 interferes with the first positioning unit 246 and positions an initial location of the rotary body 214. When the solenoid 262 is turned off, the elastic force of the elastic member 270 moves the interfering unit 282 to a location for interfering with the second positioning units 242 and 244. At this time, the interfering unit 282 interferes with the second positioning units 242 and 244 and stops the rotary body 214 at a certain location. That is, the solenoid 262 and the elastic force of the elastic member 270 move the interfering unit 282 between two locations so that it interferes with or is released from the first positioning unit 246 and the second positioning units 242 and 244. As mentioned above, the interference of the interfering unit 282 and the first positioning unit 246 or the second positioning units 242 and 244 is released by an instantaneous ON and OFF operation of the solenoid 262.

Hereinafter, the operation of the rotary force controlling apparatus according to an exemplary embodiment of the present invention is described in detail with reference to the accompanying drawings.

Figure 7:
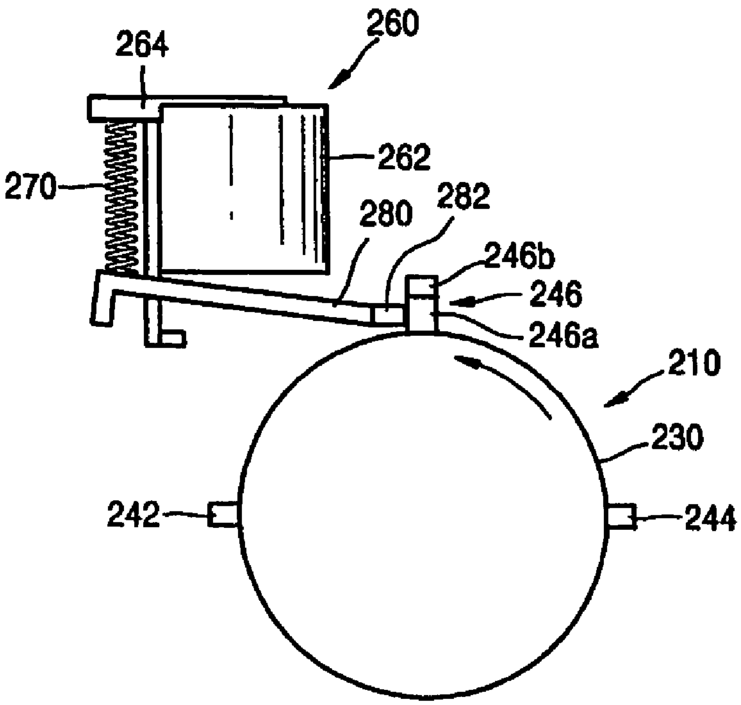
FIG. 7 illustrates the relationship between a clutch device and a solenoid unit when the solenoid unit is turned off.
Figure 8A:
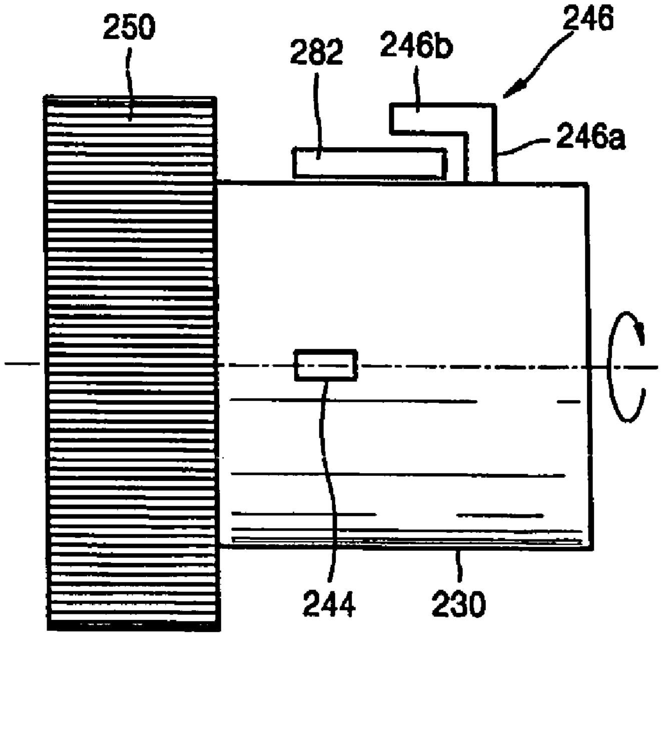
FIGS. 8A through 8C illustrate the operation when a clutch device rotates and stops when the solenoid unit is turned off.
Figure 8B:
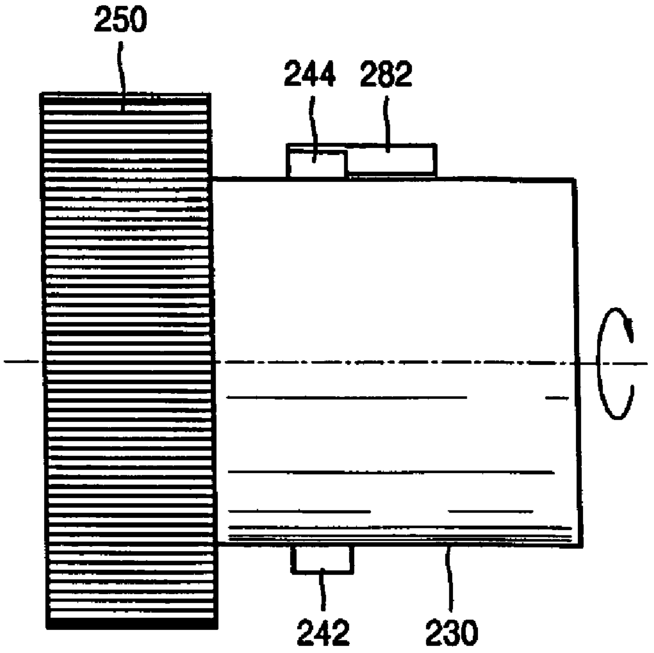
Figure 8C:
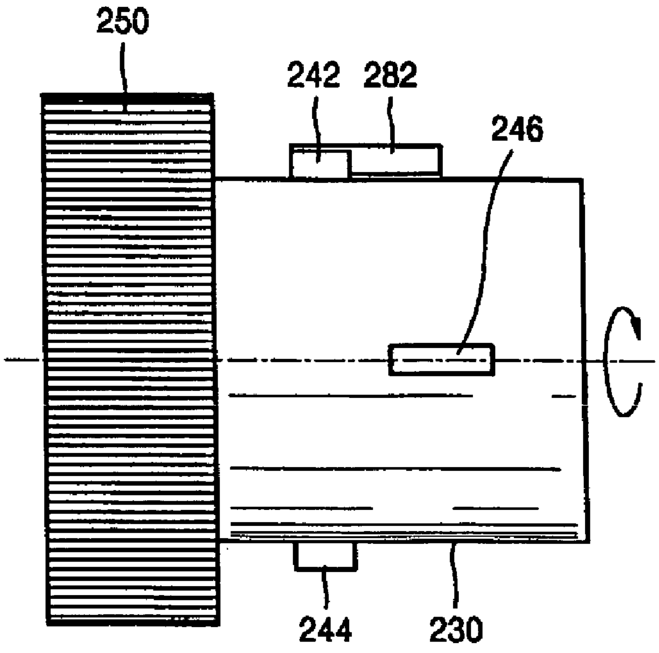
Figure 9:
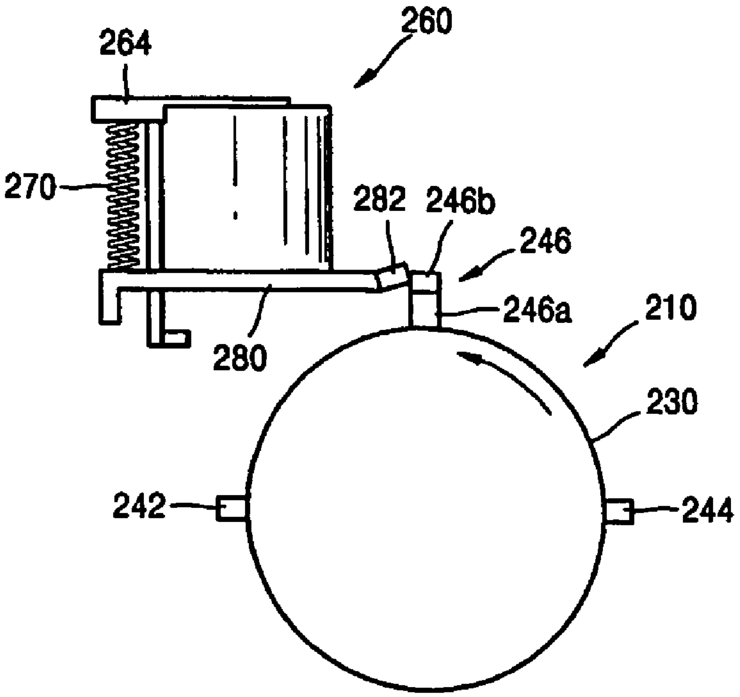
Figure 10A:
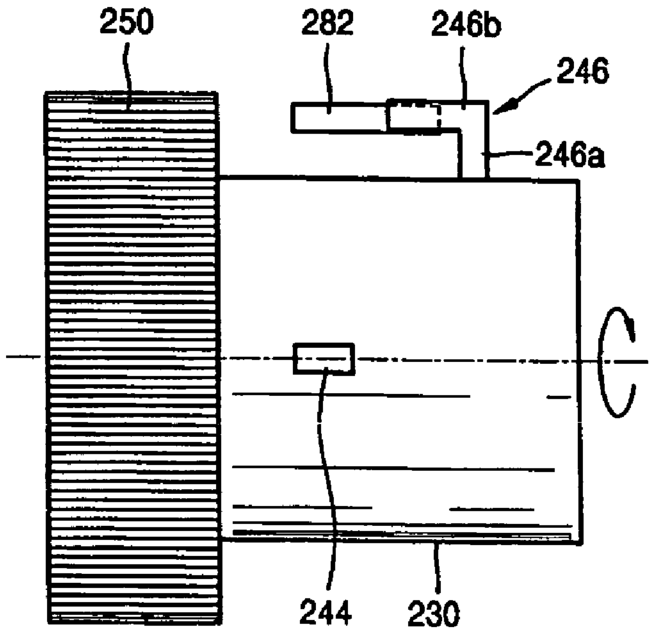
Figure 10B:
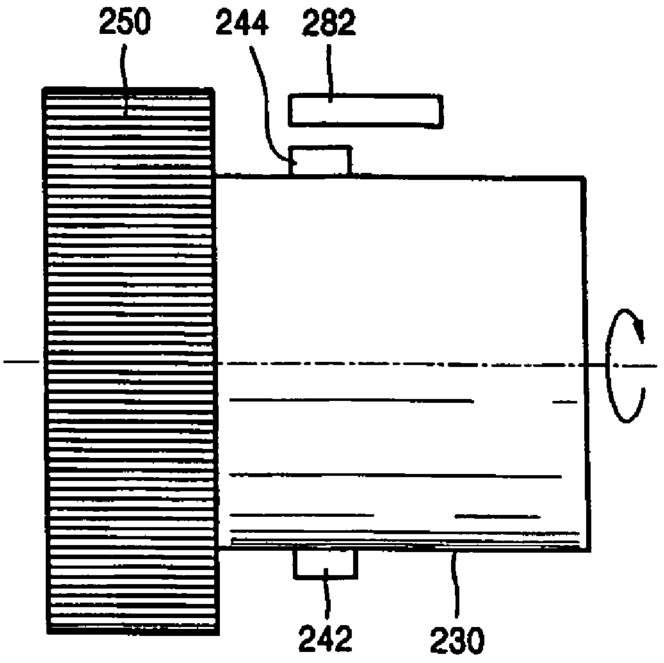
Figure 10C:
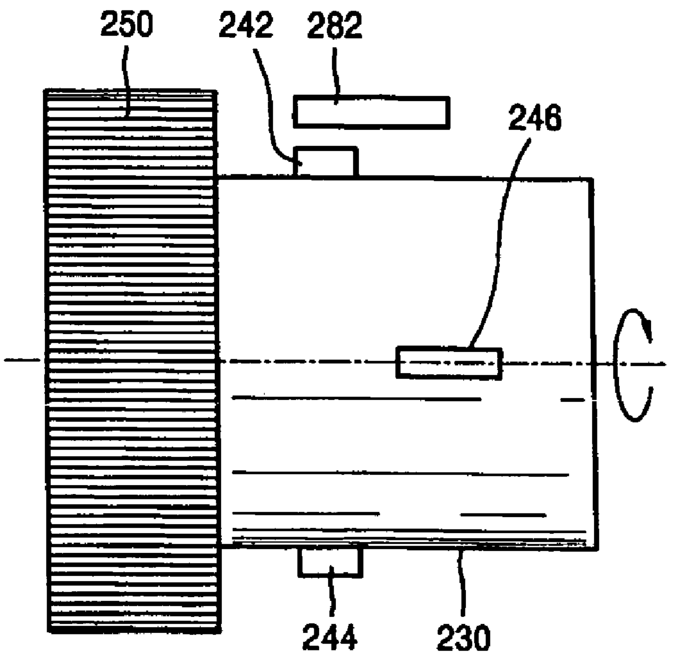

FIG. 7 illustrates the relationship between the clutch device and the solenoid unit when the solenoid unit is turned off. FIGS. 8A through 8C illustrate the operation when the clutch device rotates and stops when the solenoid unit is turned off. FIG. 9 illustrates the relationship between the clutch device and the solenoid unit when the solenoid unit is turned on. FIGS. 10A through 10C illustrate the operation when the clutch device rotates and stops when the solenoid unit is turned on.

As shown in FIG. 7, when the solenoid 262 is turned off, the armature 280 is separated from the solenoid 262 by the elastic member 270. As shown in FIGS. 7 and 8A, the interfering unit 282 is placed below the second portion 246*b*. When the rotary force is transferred to the housing 230 by the power transferring member 250, the housing 230 rotates in the direction shown by the arrows with the first positioning unit 246 mounted thereon. At this time, as shown in FIGS. 7 and 8A, since the interfering unit 282 is placed below the second portion 246*b* of the first positioning unit 246, it does not interfere with the first positioning unit 246. When the housing 230 continuously rotates in the direction of the arrow, the second positioning unit 244 interferes with the interfering unit 282, as shown in FIG. 8B. Since the power transferring member 250 slips by the operation of the clutch 220, the rotary force of the power transferring member 250 is not transferred to the housing 230. Accordingly, the rotary body 214 mounted on the shaft 212 stops rotating. When the solenoid 262 is instantaneously turned on, the interference between the interfering unit 282 and the second positioning unit 244 is released. Then, when the solenoid 262 is turned off, the second positioning unit 242 interferes with the interfering unit 282, as shown in FIG. 8C. That is, the interfering unit 282 interferes with the second positioning units 242 and 244 and stops the rotary body 214 at a certain location when the solenoid 262 is turned off.

When the solenoid 262 is turned on, the magnetic force is generated in the solenoid 262 and thus the armature 280 moves toward the solenoid 262, as shown in FIG. 9. The interfering unit 282 moves to a location where it interferes with the second portion 246*b* of the first positioning unit 246, as shown in FIGS. 9 and 10A. That is, when the solenoid 262 is turned on, the solenoid 262 attracts the armature 280 and the interfering unit 282 is moved to a location where it interferes with the first positioning unit 246 by the magnetic force of the solenoid 262. When the interfering unit 282 interferes with the first positioning unit 246, the power transferring member 250 slips by the operation of the clutch 220, and thus the rotary force of the power transferring member 250 is not transferred to the housing 230. That is, the rotary body 214 mounted on one end of the shaft 212 stops rotating. When the solenoid 262 is instantaneously turned off and then turned on, the interference between the interfering unit 282 and the first positioning unit 264 is released. As shown in FIGS. 10B and 10C, the interfering unit 282 does not interfere with the second positioning units 242 and 244 when the solenoid 262 is turned on. Accordingly, since the first positioning unit 246 interferes with the interfering unit 282 only when the solenoid 262 is turned on, it is used for setting the initial location of the rotary body 214.

Hereinafter, a rotary force controlling apparatus according to another exemplary embodiment of the present invention is described with reference to the accompanying drawings. For clarity, components having the same operation and effect as in the above exemplary embodiment are indicated by the same reference numerals.

Figure 11:
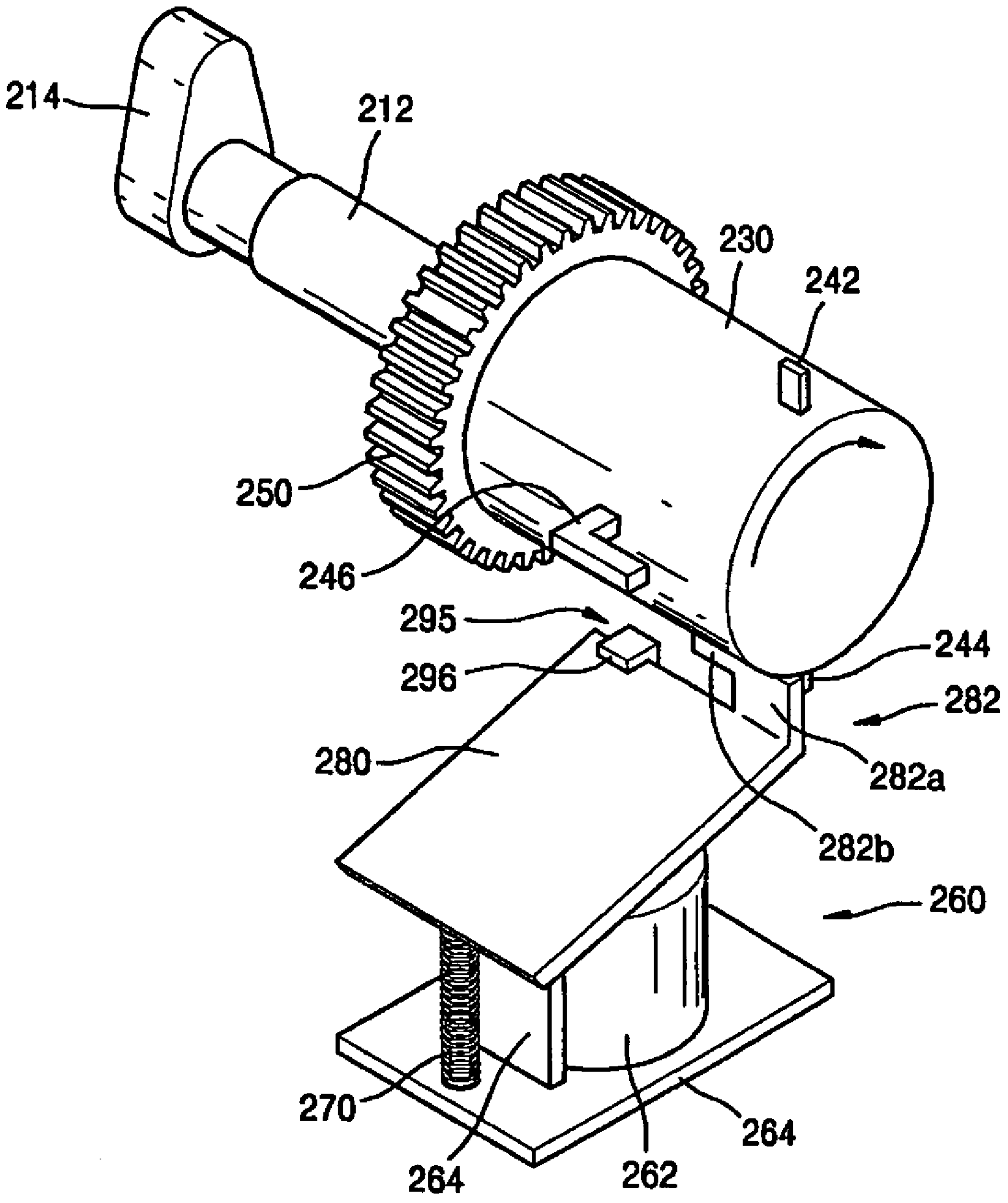
FIG. 11 is a perspective view of a rotary force controlling apparatus according to another exemplary embodiment of the present invention.
Figure 12:
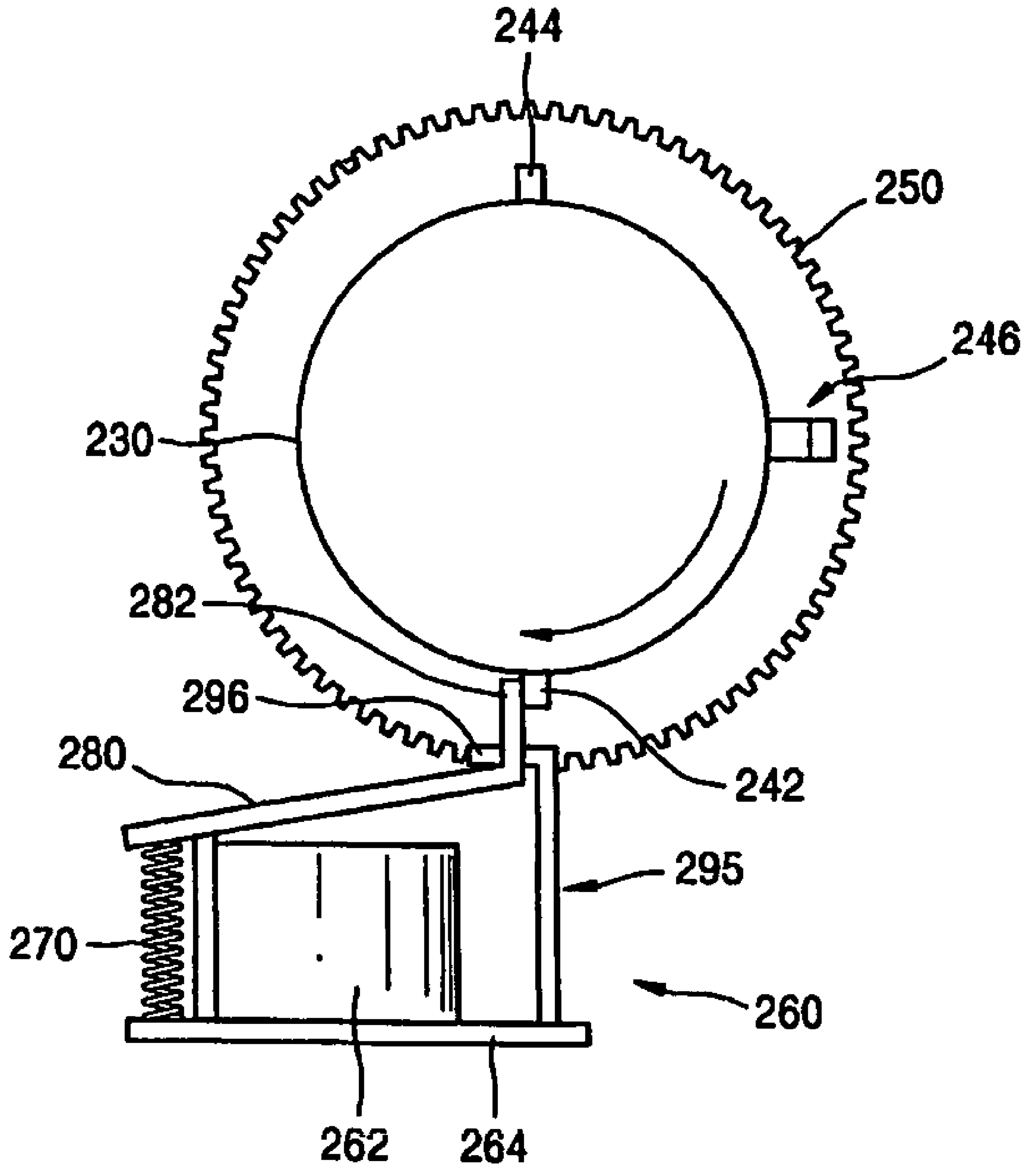
FIG. 12 is a side elevational view of the rotary force controlling apparatus of FIG. 11.
Figure 13:
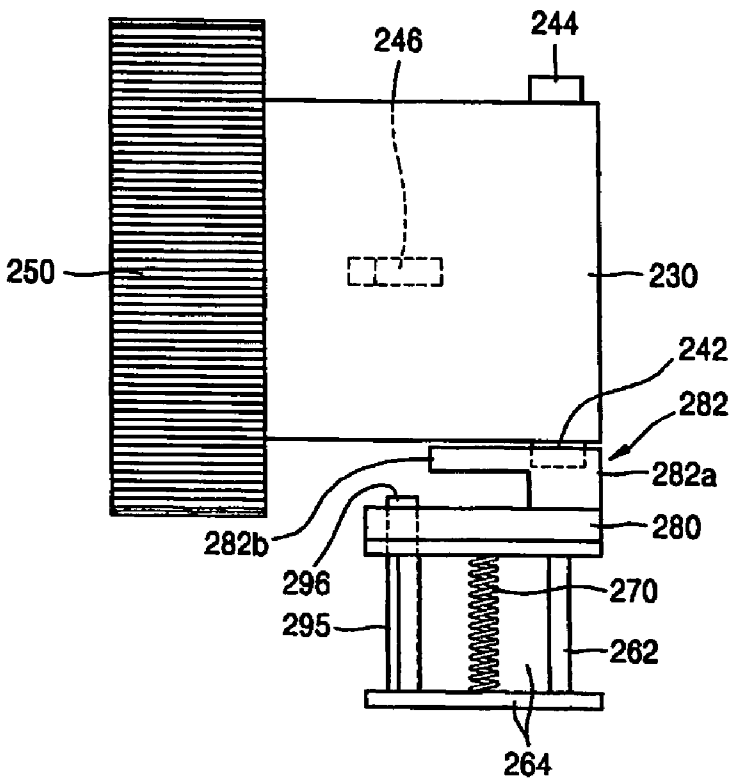
FIG. 13 is a front elevational view of the rotary force controlling apparatus of FIG. 11.
Figure 15:
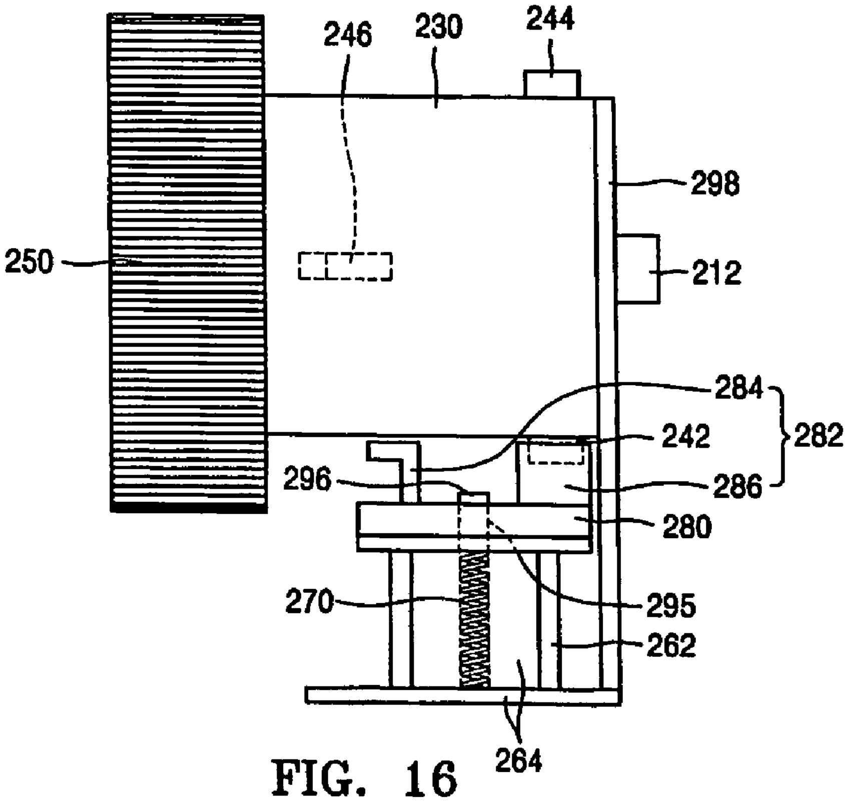
FIG. 15 is a front elevational view of a rotary force controlling apparatus according to another exemplary embodiment of the present invention.
Figure 16:
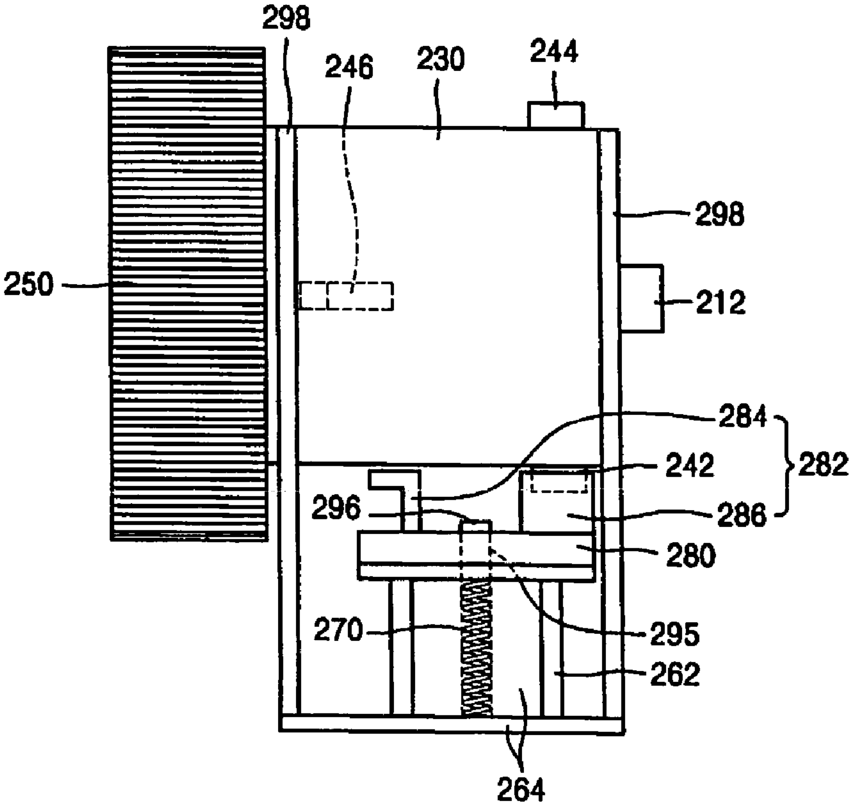
FIG. 16 is a front elevational view of a rotary force controlling apparatus according to another exemplary embodiment of the present invention.

FIG. 11 is a perspective view of a rotary force controlling apparatus according to another exemplary embodiment of the present invention. FIG. 12 is an elevational view of the rotary force controlling apparatus shown in FIG. 11. FIG. 13 is a front elevational view of the rotary force controlling apparatus shown in FIG. 11. FIGS. 14 through 16 are front elevational views of a rotary force controlling apparatus according to other exemplary embodiments of the present invention.

When the solenoid 262 is turned off, the armature 280 is spaced apart from the solenoid 262 by the elastic force of the elastic member 270. At this time, the interfering unit 282 mounted on the armature 280 may bump against the housing 230. When the housing 230 rotates while the interfering unit 282 contacts the housing 230, noise or abrasion of the equipment may be caused. To prevent the interfering unit 282, from contacting the housing 282, a stopper 295 is included to control the motion of the armature 280.

Referring to FIGS. 11 through 13, the rotary force controlling apparatus according to another exemplary embodiment of the present invention further includes a stopper 295 for controlling the motion of the armature 280, unlike the above-mentioned exemplary embodiment. One end of the stopper 295 is fixed to the bracket 264. The other end of the stopper 295 has a coupling hook 296 for controlling the motion of the armature 280. When the solenoid 262 is turned off, the stopper 295 controls the motion of the armature 280 such that the interfering unit 282 interferes with the second positioning member 242 and 244. When the solenoid 262 is turned off, the armature 280 moves away from the solenoid 262 and engages the stopper 295. Accordingly, movement of the armature 280 away from the solenoid 262 is not unrestricted. That is, the armature 280 interferes with the stopper 295 and stops at a location where the interfering unit 282 interferes with the second positioning units 242 and 244. Also, in the present exemplary embodiment, the interfering unit 282 must not interfere with the first positioning unit 246 when the housing 230 rotates when the solenoid 262 is OFF. Accordingly, the interfering unit 282 may take various shapes so that it interferes with or is released from the first positioning unit 246 and the second positioning units 242 and 244.

As shown in FIGS. 11 through 13, the interfering unit 282 includes a second interfering unit 282*a* that is angled from the armature 280 and a first interfering unit 282*b* that extends from the second interfering unit 282*a* in the axial direction of the housing 230. The first interfering unit 282*b* interferes with the first positioning unit 246 only when the solenoid 262 is turned on, and the second interfering unit 282*a* interferes with the second positioning units 242 and 244 only when the solenoid 262 is turned off.

Alternatively, as shown in FIG. 14, the interfering unit 282 includes a first interfering unit 284 that is angled from the armature 280 and interferes with the first positioning unit 246 only when the solenoid 262 is turned on, and a second interfering unit 286 that is angled from the armature 280 and spaced from the first interfering unit 284 and interferes with the second positioning units 242 and 244 only when the solenoid 262 is turned off.

As shown in FIGS. 13 and 14, the interfering unit 282 may take various shapes. These modifications do not limit the scope of the present invention. Since the structure and operation of the rotary force controlling apparatus shown in FIGS. 11 through 14 are similar to that of the above-mentioned exemplary embodiments, except that the stopper 295 is mounted on the bracket 264, their description is omitted.

Referring to FIG. 15, the rotary force controlling apparatus according to the exemplary embodiments of the present invention may further include a connecting member 298 for integrally assembling the clutch device 210 and the solenoid unit 260. The connecting member 298 supports one side of each of the clutch device 210 and the solenoid unit 260. As shown in FIG. 16, the connecting member 298 may also be provided on both sides of the clutch device 210 and the solenoid unit 260. Since the structure and operation of rotary force controlling apparatus shown in FIGS. 15 and 16 are similar to that of the above-mentioned exemplary embodiments, their description is omitted.

According to the rotary force controlling apparatus and the image forming apparatus of the exemplary embodiments of the present invention, the initial location of the rotary body 214 is positioned when the solenoid unit 260 is turned on, and the rotary body 214 stops at a certain location when the solenoid unit 260 is turned off. Also, by mounting the plurality of second positioning units on the surface of the housing 230, the rotary body 214 may be stopped at a desired location. Also, by mounting the stopper 295, the location of the interfering unit 282 may be controlled.

As mentioned above, the rotary force controlling apparatus and the image forming apparatus according to the exemplary embodiments of the present invention, the solenoid unit is turned on only when the initial location of the rotary body is set, or when the rotary body rotates to a certain location. When the rotary body stops at a certain location, the solenoid unit is turned off. Since the solenoid unit is turned off while the rotary body is stopped, the solenoid unit is prevented from being overheated.

Furthermore, according to the exemplary embodiments of the present invention, the plurality of second positioning units may stop the rotary body at a desired location, and thus the operation of the rotary body may be easily controlled.

Also, the location of the rotary body may be smoothly changed by allowing the interfering unit to interfere with the first positioning unit when the solenoid unit is turned on and to interfere with the second positioning units when the solenoid unit is turned off. That is, since the interfering unit is located adjacent to the surface of the housing when the solenoid unit is turned off, it does not interfere with the first positioning unit when the housing rotates. Accordingly, by instantaneously turning the solenoid unit on and off, the location of the rotary body may be more smoothly changed.

Further, by providing the stopper, the interfering unit may be prevented from contacting the housing when the solenoid is turned off, and thus noise or abrasion of the equipment may be prevented.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A rotary force controlling apparatus of an image forming apparatus, comprising:

a clutch device including a shaft and a rotary body mounted on one end of the shaft;

a housing into which the shaft is inserted and that rotates together with the shaft;

a power transferring member rotatably mounted in the housing and selectively rotates the housing by a clutch inserted between the housing and the power transferring member; and a positioning unit protruding from the periphery of the housing that positions a stop location of the rotary body;

a solenoid unit spaced apart from the clutch device and that is selectively turned on and off;

the positioning unit including a first positioning unit that positions an initial location of the rotary body when the solenoid unit is turned on, and a plurality of second positioning units that are separated from the first positioning unit and that stop the rotary body at other locations when the solenoid unit is turned off; and a connecting member integrally assembling both sides of the clutch device and the solenoid unit together;

wherein the second positioning units form a pair and are symmetrical around the center of the housing, and the first positioning unit is positioned at approximately 90° degrees from each of the second positioning units around the center of the housing, wherein the first positioning unit and the plurality of second positioning units are located on the same even periphery of the housing and the first positioning unit having a different shape from the plurality of second positioning units, and wherein the plurality of second positioning units have substantially the same height different than the height of the first positioning unit, such that the first positioning unit interferes with the interfering unit only when the solenoid is turned on.

2. The apparatus according to claim 1, wherein interference between an interfering unit connected to the armature and any one of the second positioning units is released by the instantaneous on and off operation of the solenoid unit.

3. The apparatus according to claim 2, wherein the interfering unit has a first interfering member and a second interfering member spaced from the first interfering member.

4. The apparatus according to claim 3, wherein the first interfering member engages the first positioning unit adapted to engage the first positioning unit when the solenoid unit is turned on, and the second interfering member engages one of the plurality of second positioning units when the solenoid unit is turned off.

5. The apparatus according to claim 1, wherein the second positioning units are located on substantially the same circumference around the surface of the housing, wherein the second positioning units have substantially equal heights that are different from a height of the first positioning unit such that the first positioning unit interferes with the interfering unit only when the solenoid is turned on.

6. An image forming apparatus, comprising:

a clutch device including a shaft and a rotary body mounted on one end of the shaft;

a housing into which the shaft is inserted and that rotates together with the shaft;

a power transferring member that is rotatably mounted in the housing and selectively rotates the housing by a clutch inserted between the housing and the power transferring member; and a positioning unit that protrudes from the periphery of the housing and has a first positioning unit that positions an initial location of the rotary body and a plurality of second positioning units that stop the rotary body at a predetermined location;

a solenoid unit including a bracket on which a solenoid is mounted;

an armature mounted on the bracket and having an interfering unit that interferes with the first positioning unit when the solenoid is turned on and that interferes with the second positioning unit when the solenoid is turned off; and an elastic member that is connected between the bracket and the armature and that provides a biasing force to the armature such that the interfering unit interferes with or is released from the first and second positioning units; and a connecting member integrally assembling both sides of the clutch device and the solenoid unit together, wherein the second positioning units form a pair and are symmetrical around the center of the housing, and the first positioning unit is positioned at approximately 90° from each of the second positioning units around the center of the housing, wherein the first positioning unit and the plurality of second positioning units are located on the same even periphery of the housing and the first positioning unit having a different shape from the plurality of second positioning units, and wherein the plurality of second positioning units have substantially the same height different than the height of the first positioning unit, such that the first positioning unit interferes with the interfering unit only when the solenoid is turned on.

7. The apparatus according to claim 6, wherein interference between an interfering unit connected to the armature and any one of the second positioning units is released by the instantaneous on and off operation of the solenoid unit.

8. The apparatus according to claim 7, wherein the interfering unit has a first interfering member and a second interfering member spaced from the first interfering member.

9. The apparatus according to claim 8, wherein the first interfering member engages the first positioning unit adapted to engage the first positioning unit when the solenoid unit is turned on, and the second interfering member engages one of the plurality of second positioning units when the solenoid unit is turned off.

10. The apparatus according to claim 6, wherein the second positioning units are located on substantially the same circumference around the surface of the housing, wherein the second positioning units have substantially equal heights that are different from a height of the first positioning unit such that the first positioning unit interferes with the interfering unit only when the solenoid is turned on.

11. A rotary force controlling method for an image forming apparatus, comprising the steps of positioning a second interfering unit connected to an armature at a first height by turning off a solenoid to move the armature away from the solenoid, a first interfering unit being connected to the armature spaced from the second interfering unit;

rotating a housing having a first positioning unit and a plurality of second positioning units connected thereto, where rotation of the housing results in rotation of a shaft connected to the housing and a rotary body connected to the shaft;

passing the first interfering unit by the first positioning unit as the first interfering unit does not engage the first positioning unit at the first height when the solenoid is off; and engaging the second interfering unit with one of the plurality of second positioning units connected to the housing, thereby stopping rotation of the housing and positioning the rotary body at a first position corresponding to the engaged second positioning unit, wherein the plurality of second positioning units have substantially the same height different than the height of the first positioning unit, such that the first positioning unit interferes with the interfering unit only when the solenoid is turned on.

12. The rotary force controlling method according to claim 11, further comprising moving the second interfering unit to a second height by turning on the solenoid to move the armature toward the solenoid, thereby disengaging the second interfering unit and the second positioning unit and causing the housing to rotate;

moving the second interfering unit to the first height by turning off the solenoid; and engaging the second interfering unit with a subsequent second positioning unit, thereby stopping rotation of the housing and positioning the rotary body a second position corresponding to the subsequently engaged second positioning unit.

13. A rotary force controlling method for an image forming apparatus, comprising the steps of positioning first interfering unit connected to an armature at a first height by turning on a solenoid to move the armature toward the solenoid, a second interfering unit being connected to the armature spaced from the first interfering unit;

rotating a housing having a first positioning unit and a plurality of second positioning units connected thereto, where rotation of the housing results in rotation of a shaft connected to the housing and a rotary body connected to the shaft;

passing the second interfering unit by any of the plurality of second positioning units as the second interfering unit does not engage the second positioning units at the first height when the solenoid is on; and engaging the first interfering unit with the first positioning unit connected to the housing, thereby stopping rotation of the housing and positioning the rotary body at an initial position corresponding to the engaged first positioning unit, wherein the plurality of second positioning units have substantially the same height different than the height of the first positioning unit, such that the first positioning unit interferes with the interfering unit only when the solenoid is turned on.

14. The rotary force controlling method according to claim 13, further comprising moving the first interfering unit to a second height by turning off the solenoid to move the armature away from the solenoid, thereby disengaging the first interfering unit and the first positioning unit and causing the housing to rotate;

moving the first interfering unit to the first height by turning on the solenoid;

passing the second interfering unit by each of the plurality of second positioning units as the interfering unit does not engage any of the plurality of second positioning units at the first height when the solenoid is on; and engaging the first interfering unit with the first positioning unit, thereby stopping rotation of the housing and positioning the rotary body at the initial position.

* * * * *